United States Patent
Ploeg et al.

(10) Patent No.: US 11,539,220 B2
(45) Date of Patent: Dec. 27, 2022

(54) REPLACEABLE SMART BATTERY PACK, A BATTERY PACK HOLDER AND A MOBILE POWER SUPPLY SYSTEM

(71) Applicant: DCPOWER HOLDING B.V., Kerkrade (NL)

(72) Inventors: Robert Wilhelmus Ploeg, Eygelshoven (NL); Martyn David Sly-Jex, Kerkrade (NL); Johannes Joseph Gregorius Derikx, Kerkrade (NL)

(73) Assignee: DCPOWER HOLDING B.V., Kerkrade (NL)

( * ) Notice: Subject to any disclaimer, the term of this patent is extended or adjusted under 35 U.S.C. 154(b) by 165 days.

(21) Appl. No.: 16/329,212

(22) PCT Filed: Aug. 7, 2017

(86) PCT No.: PCT/NL2017/050528
§ 371 (c)(1),
(2) Date: Feb. 28, 2019

(87) PCT Pub. No.: WO2018/044154
PCT Pub. Date: Mar. 8, 2018

(65) Prior Publication Data
US 2019/0252891 A1    Aug. 15, 2019

(30) Foreign Application Priority Data
Aug. 30, 2016  (NL) .................................. 2017395

(51) Int. Cl.
*H02J 7/00* (2006.01)
*H01M 10/42* (2006.01)
*H01M 10/48* (2006.01)

(52) U.S. Cl.
CPC ..... *H02J 7/00047* (2020.01); *H01M 10/4257* (2013.01); *H01M 10/48* (2013.01);
(Continued)

(58) Field of Classification Search
CPC ........................... H02J 7/0021; H02J 7/00036
(Continued)

(56) References Cited

U.S. PATENT DOCUMENTS

| 5,646,508 | A | 7/1997 | Van Phuoc |
| 2011/0078470 | A1 | 3/2011 | Wang et al. |

(Continued)

FOREIGN PATENT DOCUMENTS

EP    1775653 A2    4/2007

OTHER PUBLICATIONS

WO, International Search Report; International Application No. PCT/NL2017/050528 (dated Nov. 16, 2017) (4 pages).
(Continued)

*Primary Examiner* — Suchin Parihar

(57) ABSTRACT

Disclosed is replaceable smart battery pack (100) The battery pack comprising a number of cells (B1 . . . . B4), and a smart battery management system (102) for controlling and monitoring the number of cells, the smart battery management system is controllable by means of a first protocol using a bidirectional 2-wire bus (SMBus). The replaceable smart battery pack further comprises at least one sensor (108, 110) and an additional processor (104). Each of the at least one sensor is configured for detecting a specific user interaction with the smart battery pack and generating a control signal. The additional processor is configured to receive the control signal, to communicate with the smart battery management system by means of the first protocol in response to the control signal and to control a display unit (106) of the battery pack in response of data received from the smart battery system and the control signal.

19 Claims, 3 Drawing Sheets

(52) U.S. Cl.
CPC ............ *H01M 10/482* (2013.01); *H02J 7/00* (2013.01); *H02J 7/00036* (2020.01); *H01M 2010/4271* (2013.01); *H01M 2010/4278* (2013.01); *H01M 2220/30* (2013.01)

(58) Field of Classification Search
USPC .......................................... 716/112; 320/112
See application file for complete search history.

(56) References Cited

U.S. PATENT DOCUMENTS

| | | | | |
|---|---|---|---|---|
| 2012/0203377 | A1* | 8/2012 | Paydar | G07F 9/002 |
| | | | | 221/92 |
| 2015/0303695 | A1* | 10/2015 | Perry | H01M 10/425 |
| | | | | 307/80 |
| 2016/0241081 | A1* | 8/2016 | Nandam | H02J 9/06 |
| 2016/0294204 | A1* | 10/2016 | Deokar | H02J 7/0013 |
| 2017/0092994 | A1* | 3/2017 | Canfield | H01M 50/543 |
| 2017/0141597 | A1* | 5/2017 | Mifsud | H02J 7/00036 |
| 2017/0271891 | A1* | 9/2017 | Keates | H02J 7/0021 |
| 2017/0353042 | A1* | 12/2017 | Liu | H01M 10/441 |
| 2018/0131203 | A1* | 5/2018 | Coq | H02J 7/0047 |
| 2018/0131206 | A1* | 5/2018 | Coq | H02J 7/0029 |

OTHER PUBLICATIONS

WO, Written Opinion of the International Search Report; International Application No. PCT/NL2017/050528 (dated Nov. 16, 2017) (7 pages).

* cited by examiner

REPLACEABLE SMART BATTERY PACK, A BATTERY PACK HOLDER AND A MOBILE POWER SUPPLY SYSTEM

PRIORITY APPLICATIONS

This application is a U. S. National Stage Filing under 35 U.S.C. 371 from International Application No. PCT/NL2017/050528, filed on 7 Aug. 2017 and published as WO 2018/044154 on 8 Mar. 2018, which claims the benefit of priority to Netherlands Patent Application No. 2017395 filed 30 Aug. 2016, which applications and publication are incorporated herein by referenced in their entirety.

TECHNICAL FIELD

The invention relates to a replaceable smart battery pack. The invention further relates to a battery pack holder and a mobile power supply system.

BACKGROUND

Battery packs comprising a battery management system are commonly known in the art. A battery management system (BMS) is any electronic system that manages and controls the charging process of a rechargeable battery (cell or battery pack). Further, it protects the battery from operating outside its Safe Operating Area and monitors the state of the rechargeable battery. The communication with the battery management system may be by a standard bus such as CAN bus in automobiles or System Management Bus (SMBus) in computers. The functions of a battery management system could be implemented with several dedicated integrated circuits or within one dedicated integrated circuit. When several dedicated integrated circuits are used, the communication with the integrated circuits is via a bi-directional 2-wire bus. The I$^2$C-bus and SMBus are bi-directions 2 wire busses. A bi-directional two-wire bus is an interface bus which uses a serial clock line and a serial data line to transmit data from one device to another device. I2C and SMBus™ are commonly known two-wire busses. An example of a dedicated battery management system in one integrated circuit is the TI bq40z60. The TI bq40z60 is a Programmable Battery Management Unit that integrates battery charging control output, gas gauging, and protection for completely autonomous operation of 2-series to 4-series cell Li-Ion and Li-Polymer battery packs. For communication with other devices, it supports the Two-Wire SMBus v2.0 Interface.

In Healthcare facilities there is a need to have mobile workstations, mobile patient monitoring systems or mobile medical devices that can be used 24/7 without power interruption. This can be realized by Mobile power supply systems that use a battery pack which is hot-swappable. In that case, if the battery pack of the mobile power supply systems is depleted, the depleted battery pack could be swapped out and be replaced with a fully charged one.

SUMMARY

It is an object of the invention to provide an improved mobile battery supply environment with improved user interface with respect to battery pack handling, which allows to have less charging stations than battery packs, which enables to develop new user interfaces without the necessity to adapt the dedicated battery management system circuitry, which enables to verify the usability of a battery pack.

According to the invention, at least one of objects is achieved by a replaceable smart battery pack having the features of Claim 1. Advantageous embodiments and further ways of carrying out the invention may be attained by the measures mentioned in the dependent claims.

According to a first aspect of the invention, there is provided a replaceable smart battery pack for use in a mobile system or in a mobile power supply system for a mobile system. The battery pack comprises a number of rechargeable cells and a smart battery management system for controlling and monitoring the number of cells. The smart battery management system is controllable by means of a first protocol using a bidirectional 2-wire bus. The replaceable smart battery pack further comprises at least one sensor and an additional microprocessor. Each of the at least one sensor is configured for detecting a specific user interaction with the smart battery pack and generating a corresponding battery pack control signal. The additional microprocessor is configured to receive the corresponding battery pack control signal and to communicate with the smart battery management system by means of the first protocol in response to the corresponding battery pack control signal.

The basic idea of the present application is based on the recognition that a replaceable battery pack could be used in different environments and applications, healthcare, industry, etc. Each environment requires a different functionality with respect to the user interface needed with respect to the battery pack. For example which communication protocol could be used? What provisions are needed with respect to wet environments? What should be done to avoid sparks in explosive environments? What information should be made available on the battery pack and how to accomplish this? Smart battery management systems are dedicated electronic circuitry all performing special functions with respect to battery management. They are not designed to handle different user interface requirements. Furthermore, the integrated circuits designed for smart battery management systems are controllable by one bus protocol, for example I$^2$C, or SMBus™. So, if new functionality with respect to the user interfacing has to be added to a smart battery pack a new design of the electronic circuitry has to be redesigned, which is time consuming and costly. By adding a general purpose microprocessor to the smart battery pack, it is possible to expand or change the functionality with respect to interfacing, both user and communication interface, without redesigning the smart battery management integrated circuitry. The program in the microprocessor will determine what communication with the battery management system is needed to respond on a particular user input. By reprogramming the program of the microprocessor, the response from a particular input can easily adapted to the requirement of the user without need to change the electronic circuitry of the battery management system.

In an embodiment, a first sensor of the at least one sensor is a touch sensitive sensor which generates a first battery pack control signal corresponding to a touch profile of a user. These features enable to use only one button to initiate different user commands to be transmitted to the smart battery system. For example, if the user pushes the button for less than a second, the State of Charge (SOC) is read from a register of the battery management system, if the user pushes the bottom more than a second and less than three seconds, the State of Health (SOH) is read from a register of the battery management system, and if the user pushes the button more than three seconds, the battery management is instructed to shut down the battery pack such that the external contacts of the battery pack are disconnected from the internal cells to be floating or coupled to ground.

In an embodiment, a second sensor of the at least one sensor is configured to sense a distance between a specific location at the battery pack and a battery holder for charging and/or discharging the battery pack and to generate a second control signal providing information about the position of the battery pack in the battery holder. The additional processor generates in response to the second control signal one or more commands to be transmitted to the battery management system to activate and/or deactivate all powered output contact areas of the battery pack. The second sensor could be a hall-effect sensor, a reed relay or a push button. These features enable the battery pack to detect whether the battery pack is positioned "correctly" in a battery holding device. Only if this is the case the external contacts are empowered. So, if the battery pack is not in a battery holding device, a user cannot short circuit the battery pack and cannot be harmed by potential differences between external contacts of the battery pack.

In a further embodiment, the battery pack comprises a housing with an electrical connection side, electrical contact areas are provided in a rectangular area of a virtual plane at the electrical connection side. When the battery pack is placed in a battery holder the battery pack cannot move in a direction perpendicular to the virtual plane and the shape of the electrical connection side is such that the battery pack has to rotate around rotation axis being a line in the rectangular area prior to any of the electrical connections between the battery pack and battery holder is broken. Advantageously, the second sensor is positioned at a minimum distance from the rotation axis. In a specific embodiment, the electrical contact areas are provided in a cavity of the electrical connection side. These features enable to provide battery pack which external contacts are disconnected from an internal driving source, i.e. potential free, before any of the external contacts are disconnected from contacts of the battery holder. This feature allows usage in environments with an explosive atmosphere. In an embodiment, the battery pack further comprises a display unit. The additional processor is configured to generate commands to retrieve in response to the first battery pack control signal battery status data from the smart battery management system and to control the display unit in response to the battery status data. The use of an additional general purpose microprocessor enables to combine an existing battery management system with almost any type of display unit and to display any type of data that could be read from registers of the battery management system on the display. For example, existing battery management systems only allow outputting the State of Charge (SOC) on dedicated pins of the integrated circuitry.

In a further embodiment, in response to a first touch profile the battery status data corresponds to the State Of Charge of the number of cells and in response to a second touch profile the battery status data corresponds to the State of Health of the number of cells. These features enable to use one button to display different types of battery data on the display. In an embodiment, the first sensor is a push button.

In an embodiment, the additional processor is configured to receive commands by means of a second protocol other than the first protocol and to communicate with the smart battery management system by means corresponding commands of the first protocol in response to the commands of the second protocol. The use of a general purpose microprocessor further allows changing the external communication protocol of the battery pack, just by reprogramming the microprocessor.

In a further embodiment, the additional processor is configured to receive a second protocol command instructing the additional processor to actuate a visual indication on the battery pack. In a mobile power supply system with more than one hot swappable battery pack, this feature enables to indicate on a battery pack that it has to be replaced by a charged one.

According to a second aspect, a battery pack holder is provided for use in a power supply system for holding a smart battery pack according to any of the previous embodiments. The battery pack holder comprises activation means to interact with the second sensor on the battery pack. The activation means could generate a magnetic field that interacts with a hall-effect sensor or reed relay in the battery pack. This feature enables to empower contacts when a battery pack is positioned in the holder and to make external contacts of the battery potential free when the battery pack is removed from the holder with requiring an additional action of the user.

According to a third aspect, mobile power supply system is provided. The power supply system comprises at least one battery pack holder configured to receive a smart battery pack, and a processing unit configured to communicate with the smart battery pack using the second protocol. Having an additional microprocessor in the battery pack allows using to control the battery management system another communication protocol than for communicating directly with the battery management system. For example, I2C is not suitable to communicate over distance longer than 50 cm. The data signals could be distorted such that registers of the battery management system are overwritten by incorrect values. The CAN-bus is used in automotive application, which allows having a good communication link over meters. However, only a small number of battery management systems can communicate with the CAN-protocol. Furthermore using another protocol than a bi-directional 2-wire protocol enables to define your own command set to communicate with the battery pack. Another advantage of using the CAN-protocol is that each battery pack can have its own unique address. In I2C, the function of the function of the integrated circuit determines the address of the integrated circuit.

In an embodiment, the mobile power supply system further comprises a display unit. The processing unit is configured to request each of the smart battery packs positioned in the at least one battery holder to submit its remaining run-time. The processing unit determines an average of the received remaining run-times to obtain a value of the system remaining run-time and displays the system remaining run-time on the display unit. This feature improves the information visible on the power supply system.

In an embodiment, the processing unit is configured to request each of the smart battery packs positioned in the at least one battery holder to submit battery data enabling the processor to determine the actual absolute amount of charge in the battery pack. The processing unit is further configured to determine the battery pack with the minimum absolute amount of charge and to transmit a replace command to the battery pack with the minimum absolute amount of charge to activate a visual indication on the battery pack indicating said battery pack has to be replaced by another battery pack. This feature makes it easy for the user of the system to see which battery has to be replaced by another battery pack.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DETAILED DESCRIPTION

The embodiments described herein are not intended to limit the scope of the invention to the precise form disclosed. Rather the embodiments have been chosen and described to explain the principles of the invention and its applications and practical use to best enable others skilled in the art to follow its teachings.

Figure 1:
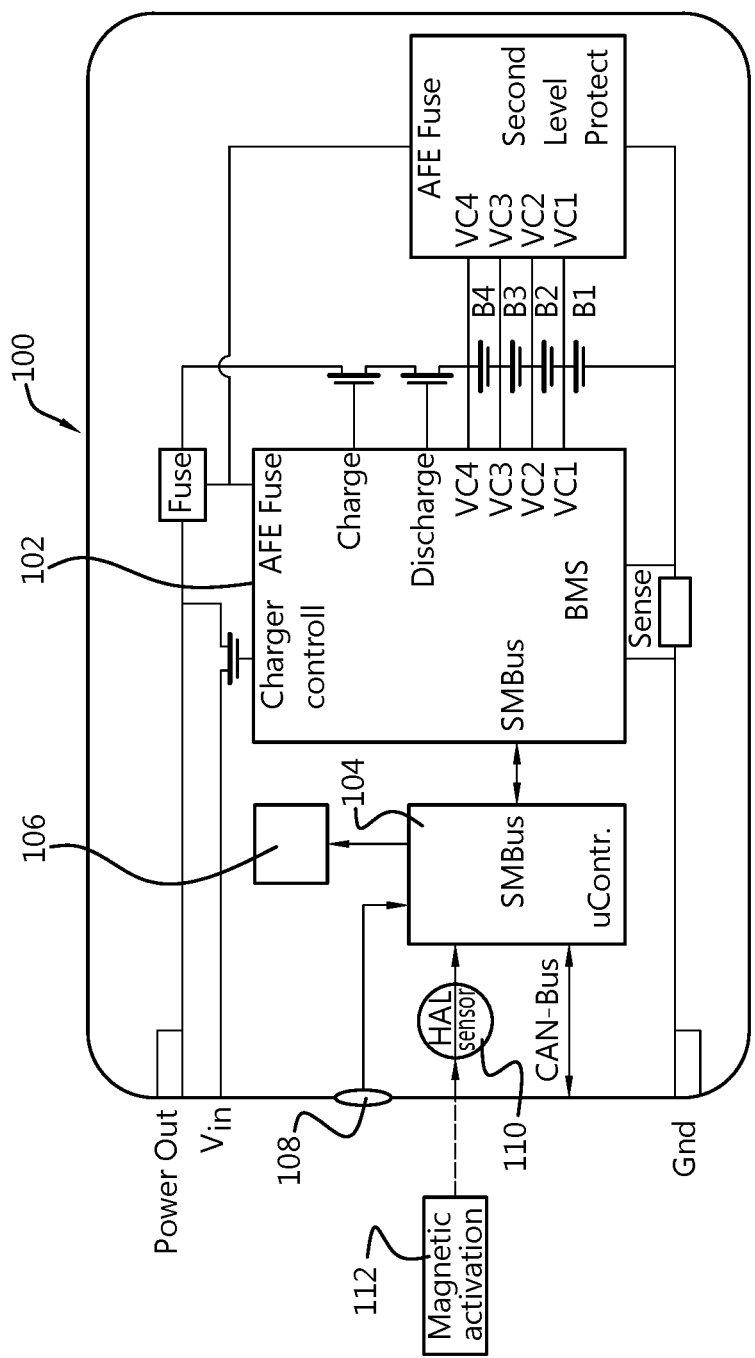
FIG. 1 is a block diagram of an embodiment of a smart battery pack in accordance with the present disclosure.

FIG. 1 shows a block diagram of an embodiment of a smart battery pack 100 in accordance with the present application. The smart battery pack is preferably a replaceable pack suitable for use in mobile applications which should be able to be used 24/7 without interruption of power supply and not necessary have to be connected to a mains power to charge the battery pack. Possible applications but not limited to be: Health care, industry and military, to power mobile workstations, mobile measuring devices, mobile transceivers, metering pumps, etc . . . . The battery pack should be preferably hot-swappable.

The smart battery pack comprises a number of rechargeable cells B1 . . . . B4, a battery management system 102 and an additional microprocessor 104. The rechargeable cells could be any suitable rechargeable battery cell available in the market. The number of rechargeable cells is not limited to 4, but depends on the battery management system used. The battery management system could be implemented with one special integrated circuit such as the TI bq40z60. The TI bq40z60 is a Programmable Battery Management Unit that integrates battery charging control output, gas gauging, and protection for completely autonomous operation of 2-series to 4-series cell Li-Ion and Li-Polymer battery packs. The battery management system 102 could also be assembled with several integrated circuits each performing a specific function of the battery management system. A characteristic is that all the integrated circuits are controllable by using the same bidirectional 2-wire bus such as the SMBus and the I2C-bus. In FIG. 1 further a fuse is shown which protects the cells against overcurrent, an overvoltage monitor and protector AFE Fuse which monitors each cell independently for an overvoltage condition and a resistor Sense connected to a coulomb counter of the battery management system. These devices are not essential features of the present application and are therefore not described in further detail.

The smart battery pack according to the present application further comprises an additional general purpose microcontroller 104 with a processor. Preferable the microcontroller is a low-power micro controller. The microcontroller is configured to communicate with the smart battery system using the bi-directional 2-wire bus SMBus on which the SMBus or I2C protocol is used. The microcontroller is further configured to receive/transmit data signals from another bus protocol. Via the other bus protocol the battery pack communicates with other devices such as a charging device or mobile power supply system. The microcontroller comprises a software program that could interpret the data signals received from the other device to obtain commands for the battery pack. Other bus protocols might be and are not limited to RS-485, CAN (Controller Area Network), LIN (Local Interconnect Network), FlexRay, MOST (Media Oriented Systems Transport), Internet protocol. The communication between the battery pack and the other device might be wired or wireless. From the above it is clear that the additional processor is configured to receive commands from external devices by means of a second protocol other than the first protocol to communicate with the battery management system. The additional processor converts the command data from second protocol into commands to be submitted to the battery management system and data received from the battery management system into data packets to be transmitted over the second protocol to the external device requesting said data.

The smart battery pack further comprises a display unit 106. The display unit could be any type of display suitable to display information related to the battery pack. It could be in the form of a number of LEDs. For example, a series of five LEDs wherein the number of active LEDs indicate the State of Charge (SOC) or State of Health (SOH), e.g. one LED 0-20% SOC, two LEDs 21%-40% SOC, three LEDs 41%-60% SOC, four LEDs 61%-80%, five LEDs 81%-100%. The display unit 106 could also be an LCD display.

When the battery pack is in a charging device, the display unit 106 could be used to display the SOC and whether the battery pack is being charged. For example, one or more blinking LEDs could be used to indicate in what range the battery pack is being charged and only non-blinking active LEDs indicate the SOC and that the battery is not being charged. This enables to verify whether the charger is properly charging the battery pack or there is a problem. The additional processor is used to monitor the charging process by reading data from the corresponding registers in the battery management system. This feature is also advantageous when the battery pack is used in a mobile power supply system and the mobile power supply system is connected to a mains supply.

The smart battery pack further comprises a touch sensitive sensor 108. The touch sensitive sensor could be any type of push button 108. In case the display unit 106 comprises a touch screen, the touch sensitive sensor 108 is part of the display unit 106. By touching the touch sensitive sensor in a particular way, the battery pack will perform a corresponding function. For example when pressing the button for less than one second, show on the display unit 106 the SOC of the battery pack for a predetermined time period of for instance four or five seconds, pressing the button for more than one second and less than three seconds show the State of Health of the battery pack for another predetermined time period of, for instance four or five seconds and pressing the button for more than three seconds make the connectors of the battery pack potential free. It might be clear that this concept can easily be adapted to perform other functions by the battery pack. The touch sensitive sensor could also be in the form of a capacitive touch button, slider, wheel user interface or touchscreen.

The battery pack further comprises a second sensor 110. A characteristic of this sensor is that it is configured to sense a distance between a specific location at the battery pack and a battery holder for charging and/or discharging the battery pack and to generate a second control signal providing information about the position of the battery pack in the battery holder. The second sensor is used to detect whether the battery pack is in a battery holder of a charging system or mobile power supply system. When the second sensor detects that it is not in a holder, it switches the battery pack in an off-state. In the off-state, the integrated circuits are set, if possible, in a low power mode and the external contact areas of the battery pack are disconnected from their source to be floating contacts to become potential free. This feature has the advantage that the battery pack cannot be short circuited when it is not in a holder. This allows cleaning the battery pack with liquids which is advantageous in health care.

In FIG. 1, the second sensor 110 is a magnetic field sensor in the form a hall-effect sensor. However any type of magnetic field sensing device might be used, for example but not limited to magneto-diode, magneto-transistor, magneto-optical sensor and MEMS-based magnetic field sensors. Activation means 112 generating a magnetic field is part of the battery holder and positioned at a position which is near the hall-effect sensor when the battery pack is placed in the battery holder. The activation means 112 might be a permanent magnet. When the battery pack is removed from the battery holder, the magnetic field sensed by the magnetic field sensor will decrease and as soon as the magnetic field drops below a predefined level the hall-effect sensor generates a corresponding signal indicating that the battery pack is not in a battery holder, the microcontroller will generate in response to said signal commands for the battery management system to switch off the electrical contact areas of the battery pack and to put the battery pack in an off-state. The Hall Effect sensor might be an analog output Hall Effect sensor or a digital output Hall Effect sensor. In case of an analog hall-effect sensor, a second control signal is generated which amplitude corresponds to the magnetic field sensed by the sensor. The microcontroller 104 analyses the second control signal and could use a programmable threshold to decide when the battery pack is positioned in the battery holder and when it is removed. For threshold for positioning and removing might have different values.

Figure 2:
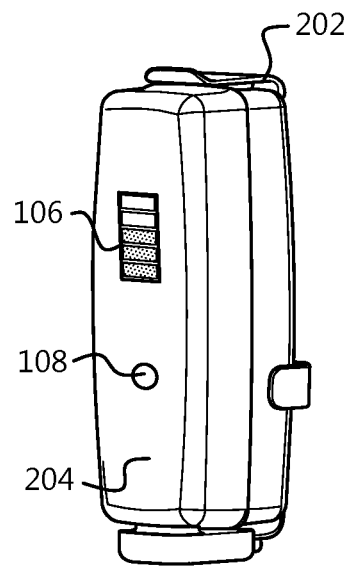
FIG. 2 is a perspective view of a battery pack placed in a battery holder.

FIG. 2 is a perspective view of an embodiment of a battery pack 204 placed in a battery holder 202 according to the present application. It shows further the touch sensitive sensor 108 and the display unit 106. The display comprises five segments. The lower three segments are in an on-state and the upper two segments are in an off-state. In an embodiment all segments in the on-state indicates a SOH between 90% and 100%, the lower four in the on-state and the upper in the off-state indicates a SOH between 80% and 90%, the lower three in the on-state and the upper two in the off-state indicates a SOH between 70% and 80%, the lower two in the on-state and the upper three in the off-state indicates a SOH between 60% and 70% and the lowest segment in the on-state and the upper four in the off-state indicates a SOH between 50% and 60%. Consequently, in FIG. 2, assuming the display shows the SOH after touching the button 108, the SOH of the battery pack is between 70% and 80%. A more precise indication could be given by generating a blinking segment by switching a segment between on-state and off-state and having the segments below said segment in the on-state and the segments above said segment in the off-state. A blinking segment indicates the lower half of the range corresponding to said segment and a non-blinking segment indicates the upper half of the range corresponding to said segment. For example, given the above specified ranges for SOH, four non-blinking segments indicate the SOH is between 85% and 90%, and three lower non-blinking segments and a fourth blinking segment indicate the SOH is between 80% and 85%. It might be clear that instead of a five segment display also five LED's could be used and instead of segments above each other, the segments could be next to each other. Furthermore, the number of segments is not fixed to five but depends on user requirements.

Figure 3:
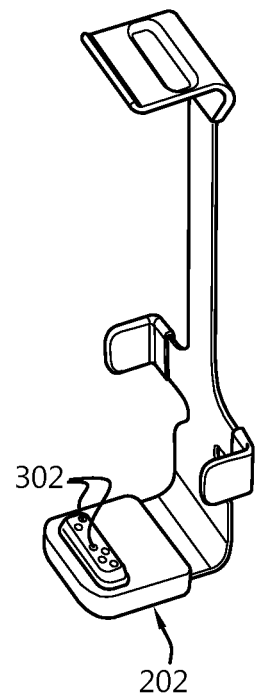
FIG. 3 is a perspective view of a battery holder.

FIG. 3 is a perspective view of the battery holder shown in FIG. 2 without battery pack. At the lower side of the battery holder electrical contacts are provided in a rectangular area. FIG. 3 shows six contacts. At one side two contacts are electrical ground contacts GND, at the opposite side two contacts are power out contacts for supplying power to the mobile device. One of the two contacts in between is a charge input for charging the battery pack and the other of the two contacts is for the communication bus. It might be clear that in this embodiment, a single wired CAN-bus is used. If a balanced two-wired CAN-bus is used two contacts for communication should be provided. Two contacts for both GND and power out voltage are provided to reduce the current through each of the electrical contacts. More than one contact is necessary in case the maximum allowed current through an electrical contact is lower than the maximum current needed to supply the mobile device.

Figure 4:
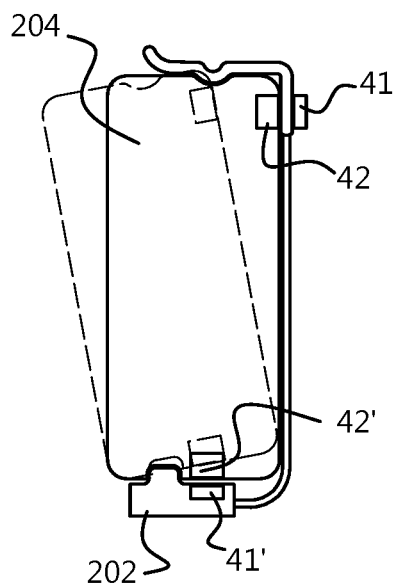
FIG. 4 illustrates two possible places to position a sensor in the battery pack and activation means on the battery holder.
Figure 5:
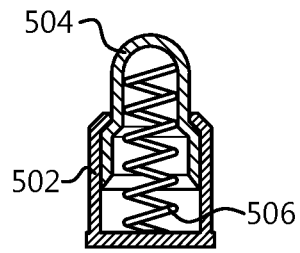
FIG. 5 is a sectional view of a contact on the battery holder.

FIG. 4 illustrates two possible locations to position the magnetic field sensor 42, 42', to sense a distance between a specific location at the battery pack and activation means 41, 41', is magnetic field generating device on the battery holder. The battery holder could be part of a device for charging and/or a device for discharging the battery pack. The battery pack comprises a housing 204 with an electrical connection side. In FIG. 4 at the lower side electrical contact areas are provided in a rectangular area of a virtual plane at the electrical connection side. The electrical contacts are positioned in a pattern corresponding to the electrical contacts in the rectangular contact area of the holder. The electrical connection side of the battery pack and the electrical connection side of the battery holder have co-acting profiles such that when the battery pack is placed in a battery holder the battery pack cannot move in a direction perpendicular to the virtual plane and the co-acting shapes of the battery pack and the battery holder are such that the battery pack has to rotate around rotation axis being a line in the rectangular area prior to any of the electrical connections between the battery pack and battery holder is broken and subsequently taken out of the battery holder. In the present embodiment, the electrical contact area of the battery pack is in a cavity at the electrical connection side and the electrical contact area of the battery holder is a raised ridge which is inserted in the cavity when the battery pack is placed in the holder. The contacts on the battery holder are preferably spring contacts. This enables to compensate small changes in distance between the virtual plane of the contact areas on the battery pack and battery holder when the battery pack is rotated in the holder before the battery pack can be taken from the holder in a direction perpendicular to the virtual plane. FIG. 5 shows a sectional view of an embodiment of a contact on the battery holder in the form of a spring-loaded contact pin also known as Pogo pin. The contact comprises a fixed part 502 which is affixed on electronic circuitry of the holder. A movable part 504 which is moveable in axial direction in the fixed part and a coil spring 506 in a cavity formed by the fixed part and the movable part.

The first position is a pair of magnetic field sensor 42 and activation means 41 which are positioned at a larger distance from the rotation axis then the pair of magnetic field sensor 42' and activation means 41' at the second position. It might be clear to the skilled person that how larger the distance from the rotation axis the larger the distance between sensor and activation means could be before an electrical connection between batter pack and battery holder will be broken and that there is a minimum distance to be able to have enough change in magnetic field to detect reliable the rotation of the battery pack before it is taken from the battery holder.

It should be noted that if the magnetic field sensor and activation means are positioned in the area of the electrical contacts, that it is not possible to detect the rotation movement and only the movement in a direction perpendicular to the virtual plane of the electrical contacts of the battery pack.

In an alternative embodiment the sensor to detect the distance is a push button on the battery pack and the activation means is a protrusion on the battery holder. When the battery pack is in the holder, the protrusion, i.e. activation means, cooperates with the push button, i.e. sensor, on the battery pack and as soon as the battery pack is rotated, the push button will be released and a corresponding signal is transmitted to the micro controller.

Figure 6:
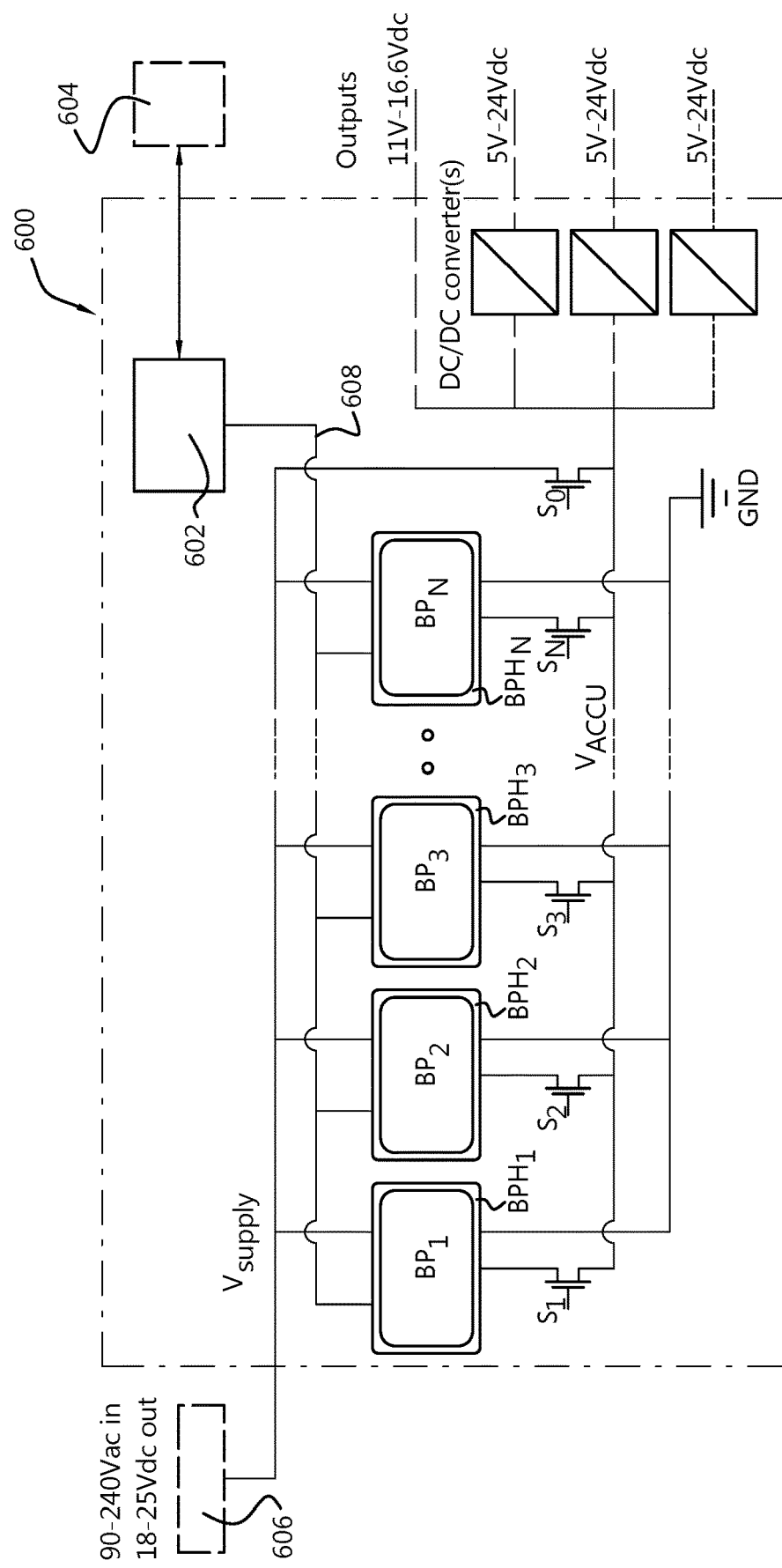
FIG. 6 is a block diagram of a mobile power supply with four holders for hot swappable battery packs.

FIG. 6 is a block diagram of a mobile power supply system 600 with four holders for hot swappable battery packs. The mobile power supply system could be integrated in a mobile device but could also be a stand-alone system to supply power to a mobile device, e.g. a mobile workstation, mobile patient monitoring system, an intensive care nursery (ICN). The mobile power supply system comprises a processing unit 602, a number of battery pack holders $BPH_1$ . . . . $BPH_N$, and power convertors. The number of battery pack holders depends on the type of application. In FIG. 6 only DC/DC converters are shown. It might be possible that the system also comprises a DC/AC converter. This enables to supply power to a device which is not intended to be mobile and to use this device in a mobile environment.

Furthermore, the power supply system comprises a display unit 604. The display unit 604 can be build-in and/or remote from the housing of the power supply system. The display unit 604 is used to display status information of the supply system and the battery packs positioned in any of the battery pack holders. Furthermore, the system comprises optionally an AC/DC power convertor 606 to convert power of a power main to a voltage $V_{SUPPLY}$ suitable to charge the battery packs positioned in any of the holders.

A communication bus 608 is provided between the processing unit 602 and each of the battery pack holders $BPH_1$ . . . . $BPH_N$. The processing unit can communicate via this bus with any of the battery packs positioned in any of the holders. The communication could be by any suitable communication protocol such as but not limited to RS-485, CAN (Controller Area Network), LIN (Local Interconnect Network), FlexRay, MOST (Media Oriented Systems Transport). Switches $S_0$ . . . . $S_N$ are provided to prevent that energy from one battery pack can flow into another battery pack or even to the AC/DC power convertor 606 and a battery pack is charged via line $V_{ACCU}$. Switch $S_i$ is controlled by the output voltage of battery pack $BP_i$ and is only open when the voltage at line $V_{ACCU}$ is higher than the output voltage of battery pack $BP_i$ in battery pack holder $BPH_i$, where i an integer greater than 0. The same principle applies for switch $S_0$.

An advantage of the battery packs according to the present application is that each battery has a unique address on the communication bus. This is not the case with the I2C and SMBus protocol. In those two protocols each Integrated circuit (IC) of a specific type performing a specific function or functions has a unique address. Furthermore, only 255 different addresses are available. CAN allows assigning to each battery a unique address. This allows to request from each individual battery pack battery or cell related data. There is no risk that two battery packs have the same address on the communication bus 608.

Furthermore, when a battery pack is inserted in a holder of the supply system, it will identify itself on the bus and the processing unit will notice that a "new" battery pack is added to the system and will take the "new" battery pack into account when determining the status of the mobile power supply system.

In an embodiment the processing unit 602 is configured to request each of the smart battery packs $BP_1$ . . . . $BP_4$ positioned in the at least one battery holder to submit its remaining run-time. Subsequently, the processing unit determines the average of the received remaining run-times to obtain a value of the system remaining run-time. The average remaining run-time is subsequently displayed on the display unit 604. If the average remaining run-time falls below a predefined value, the power system could generate a visual or sound alarm that at least one battery pack in the holders of the battery power supply system has to be replaced with another battery pack. The processor can send a second protocol command to the battery pack to be replaced that the battery pack should actuate a visual indication on the battery pack that it has to be replaced. The additional processor of the addressed battery pack receives the second protocol command and actuates a visual indication on the battery pack. This has the advantage for a user which has to replace the battery pack that the user immediately can see which battery pack has to be replaced. He doesn't have to remember in which holder the battery pack is that has to be replaced.

To determine which battery pack has to be replaced, the processing unit requests each of the smart battery packs positioned in the at least one battery holder to submit battery data enabling the processor to determine the actual absolute amount of charge in the battery pack. The processing unit determines the battery pack with the minimum absolute amount of charge and transmits a replace command to the battery pack with the minimum absolute amount of charge to activate a visual indication on the battery pack indicating said battery pack has to be replaced by another battery pack.

It might also be possible that the user requests the mobile power supply system via an input generating a user input signal to determine the battery with the minimum absolute amount of charge. This has the advantage, that the user can replace a battery pack at any time before the average remaining run-time drops below a predefined threshold. This enables to increase the amount of power when the user has time to do it and overcomes the situation that the user does not have to time replace battery packs while using the mobile device powered by the mobile power supply system and another person has to help him to replace a battery pack before the mobile device runs out of power.

In the present application a battery pack, battery pack holder and mobile power supply system are described which improves the user interface of the battery pack and/or the mobile power supply system. The additional microprocessor in the battery pack enables to improve the user interface of the battery with changing the electronic circuitry of the battery management system. By changing the program of the microprocessor, the user interface could be changed. Furthermore, the additional microprocessor allows changing the number of inputs and outputs for the user interface easily. The additional microprocessor further enables to change easily the protocol to control the battery pack. This reduces the time to develop a battery pack for a particular application. As the additional processor is able to analyse an input signal in time domain, one push button could be used to generate several different commands. This provides an easy way to develop a user interface compliant with requirements of different environments and/or clients. The combination of additional processor and display unit also allows using complex algorithms to determine in the battery pack whether the battery pack is still useable, i.e. has sufficient capacity to store energy, or has to be replaced by a new fresh battery. This can be verified without using specific additional peripherals as the result is displayed on the battery pack. It allows further verification of the status of a battery pack. If a user finds a battery pack which is not in a charging device, he has to know whether there is enough energy stored in the battery to power a mobile system for a predetermined time. The State of Charge only provides information about the relative charge status of the battery pack between "full" 100% and depleted "0". The State of Health only provides information of the relative maximum battery capacity related to the original maximum capacity (name plate capacity) of the battery pack. It does not provide information about the actual amount of charge in the battery pack. The additional processor enables to provide a very simple user interface on the battery. By pushing a button on the battery pack, three different statuses could be given. 1) Charge battery, for example by an orange LED, 2) Battery comprise enough charge, for example by a green LED, and 3) End of life battery pack, for example by a red LED. The microprocessor retrieves the necessary information from the battery management system and determines subsequently which of the three statuses should be displayed on the display unit in response to a corresponding user input signal.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the scope and spirit of the appended claims.

The invention claimed is:

1. A replaceable smart battery pack (100) for use in a mobile device, the battery pack comprising a number of cells (B1 . . . . B4), and a smart battery management system (102) for controlling and monitoring the number of cells, the smart battery management system is controllable by means of a first protocol using a bidirectional 2-wire bus (SMBus);
wherein the replaceable smart battery pack further comprises at least one sensor (108, 110) and an additional processor (104), wherein the at least one sensor is configured for detecting a touch profile of a user or a magnetic field and generating a corresponding battery pack control signal, the additional processor is configured to receive the corresponding battery pack control signal and to communicate with the smart battery management system by means of the first protocol in response to the corresponding battery pack control signal; and
wherein the additional processor is further configured to communicate via a second protocol other than the first protocol with a device external to the replaceable smart battery pack and to communicate with the smart battery management system via corresponding commands of the first protocol in response to the commands of the second protocol.

2. The battery pack according to claim 1, wherein a first sensor (108) of the at least one sensor is a touch sensitive sensor which generates a first battery pack control signal corresponding to a touch profile of a user.

3. The battery pack according to claim 2, wherein in response to the first battery pack control signal the additional processor is configured to generate one or more commands to be transmitted by means of the first protocol to the smart battery management system to deactivate all powered output contact areas of the battery pack.

4. The battery pack according to claim 1, wherein a second sensor (110, 42, 42') of the at least one sensor is configured to sense a distance between a specific location at the battery pack and a battery holder for charging and/or discharging the battery pack and to generate a second control signal providing information about the position of the battery pack in the battery holder, and wherein the additional processor is configured generate in response to the second control signal one or more commands to be transmitted to the battery management system to activate and/or deactivate all powered output contact areas of the battery pack.

5. The battery pack according to claim 4, wherein the second sensor is a hall-effect sensor or a push button.

6. The battery pack according to claim 4, wherein the battery pack comprises a housing (204) with an electrical connection side, electrical contact areas are provided in a rectangular area of a virtual plane at the electrical connection side, when the battery pack is placed in a battery holder the battery pack cannot move in a direction perpendicular to the virtual plane and the shape of the electrical connection side is such that the battery pack has to rotate around rotation axis being a line in the rectangular area prior to any of the electrical connections between the battery pack and battery holder is broken.

7. The battery pack according to claim 6, wherein the second sensor (42, 42') is positioned at a minimum distance from the rotation axis.

8. The battery pack according to claim 6, wherein the electrical contact areas are provided in a cavity of the electrical connection side.

9. The battery pack according to claim 2, further comprising a display unit (106), the additional processor is configured to generate commands to retrieve in response to the first battery pack control signal battery status data from the smart battery management system and to control the display unit in response to the battery status data.

10. The battery pack according to claim 9, wherein in response to a first touch profile the battery status data corresponds to the State of Charge of the number of cells and in response to a second touch profile the battery status data corresponds to the State of Health of the number of cells.

11. The battery pack according to claim 2, wherein the first sensor (108) is a push button.

12. The battery pack according to claim 1, wherein the bidirectional 2-wire bus is an I2C-bus or SMBus™.

13. A battery pack according to claim 1, wherein the additional processor is configured to receive a second protocol command instructing the additional processor to actuate a visual indication on the battery pack.

14. A battery pack holder for use in a power supply system for holding a smart battery pack according to claim 4, wherein the battery pack holder comprises activation means (41, 41') to cooperate with the second sensor (42, 42').

15. A battery pack holder according to claim 14, wherein the activation means generates a magnetic field.

16. A mobile power supply system (600) comprising at least one battery pack holder configured to receive a smart battery pack ($BP_1 \ldots BP_N$) according to claim 13, and a processing unit (602) configured to communicate with the smart battery pack using the second protocol.

17. A mobile power supply system according to claim 16, wherein the mobile power supply system further comprises a display unit (604), the processing unit (602) is configured to request each of the smart battery packs ($BP_1 \ldots BP_N$) positioned in the at least one battery holder to submit its remaining run-time, to determine the average of the received remaining run-times to obtain a value of the system remaining run-time and to display the system remaining run-time on the display unit.

18. A mobile power supply system according to claim 16, wherein the processing unit is configured to request each of the smart battery packs positioned in the at least one battery holder to submit battery data enabling the processor to determine the actual absolute amount of charge in the battery pack, the processing unit is further configured to determine the battery pack with the minimum absolute amount of charge and to transmit a replace command to the battery pack with the minimum absolute amount of charge to activate a visual indication on the battery pack indicating said battery pack has to be replaced by another battery pack.

19. A mobile power supply system according to claim 18, wherein the replace command is transmitted when the system remaining run-time drops below a predetermined threshold.

\* \* \* \* \*